March 18, 1969   J. D. GIULIE   3,433,343

SEGREGATING DEVICE

Filed April 4, 1967

INVENTOR.
JOE D. GIULIE

BY

ATTORNEYS

United States Patent Office 3,433,343
Patented Mar. 18, 1969

3,433,343
SEGREGATING DEVICE
Joe D. Giulie, Sunnyvale, Calif., assignor to Icore Industries, a corporation of California
Filed Apr. 4, 1967, Ser. No. 628,494
U.S. Cl. 193—31
Int. Cl. B65g 11/20, 47/52
2 Claims

ABSTRACT OF THE DISCLOSURE

A mechanical amplifier for use in a segregating device where cans or similar articles are diverted into a plurality of paths, comprising a path having a raised central portion in the form of a divergent slide so that articles can slide over the central portion in one path or, when diverted slightly from the central path will be separated to a greater degree as they slide over the side paths.

BACKGROUND OF THE INVENTION

Field of the invention

Article inspection devices, such as scales, wherein articles are segregated into a plurality of paths depending on some particular property.

Description of the prior art

The closest known prior art is U.S. Patent 3,237,743 showing a slide reject conveyor. The present invention offers three major advantages over this patent. Firstly, the present invention does not require complicated metal bending operations but comprises merely two flat sheets of material held in face to face engagement. Secondly, the center path of the present invention is of divergent form so that articles are fully supported throughout their path of travel while the cited patent shows a convergent path, so if an article is slightly off to one side it may tilt over as the path becomes narrower, resulting in an improper reject action. Thirdly, the present invention has a sharp ledge at either side of the central path so that a positive divergent action is secured.

SUMMARY OF THE INVENTION

In the segregating articles, such as filled cans of food, wherein it is desired to divert the articles into two or more paths such as on-weight, over-weight and under-weight, it is desirable to provide some form of mechanical amplifier so a can upon being slightly diverted from its forward path will be further diverted by the mechanical amplifier. The advantages of such a system are that relatively small diversion elements can be used rather than requiring that the element push the can for some distance. Further, since the distance through which the can initially moves is quite small, a gentle action is produced so that there is no tendency to upset a can or dent it. This is particularly important if the container does not have a top, as is frequently the case. Although mechanical amplifiers were known previously, as is set out above under description of the prior art, the present invention possesses several advantages over heretofore known devices for accomplishing a similar purpose.

DESCRIPTION OF THE PREFERRED EMBODIMENTS

Figure 1:
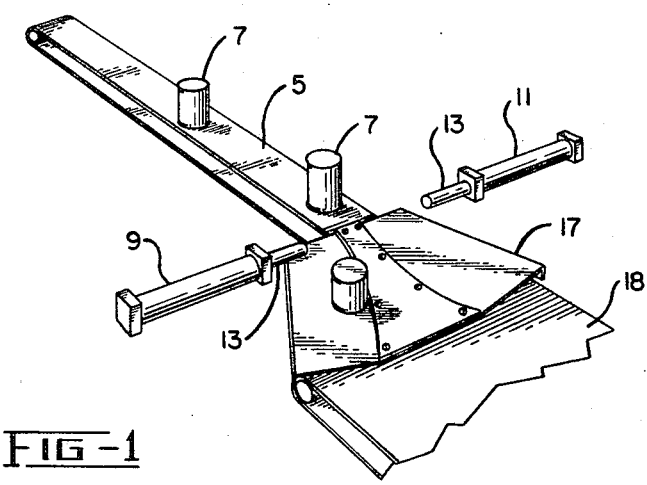
FIGURE 1 is a perspective view of a conveyor line embodying the separator device of the present invention.
Figure 2:
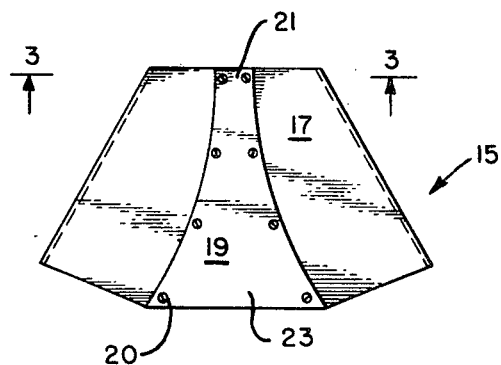
FIGURE 2 is an enlarged plan view of the separator device of the present invention.
Figure 3:
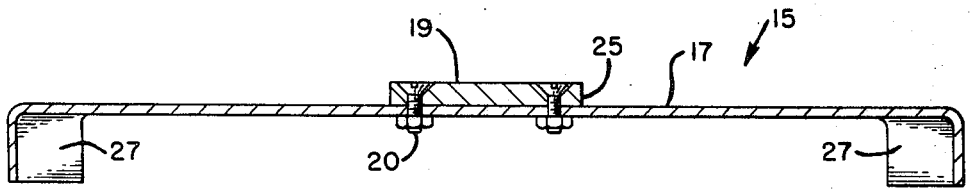
FIGURE 3 is an enlarged section on the line 3—3 of FIGURE 2.

A conveyor 5 is shown having a plurality of articles 7 thereon such as cans or other food containers. These containers have been previously filled and subjected to some form of inspection such as a weighing to determine whether the containers are on-weight, over-weight or under-weight. Such inspection devices form no part of the present invention and therefore are not described. After the containers pass over the conveyor 5 in the direction shown by the arrow and are deposited on strip 19, they pass between two rejection devices 9 and 11. These rejection devices may take various forms and may be electrically, pneumatically, hydraulically or otherwise operated and in any event, include an element 13 which is adapted to deflect a container 7 to one side or the other of the conveyor if actuated.

The mechanical amplifier or segregating device of the present invention proper has been generally designated 15 and consists of a pan or apron 17 having a central member 19 mounted thereon and held by any suitable means such as bolts 20. Device 15 may be horizontal in which case the inertia of the moving articles or some mechanical propelling means causes them to move over the device, or the path may be slanted so that movement is wholly or partially induced by gravity. Both members may be made of any suitable material having a low coefficient of friction such as sheet metal or plastic. It is frequently desirable to employ two different materials so that the apron 17 may be formed of sheet metal while the center member 19 may be formed of a low friction plastic. As can be seen from the drawings, the center member is gently curved in a divergent manner from a relatively narrow entrance section at 21 to a fairly wide exist section at 23. Further, since the center member 19 has abrupt side walls, a definite ledge 25 is formed between the center member 19 and the apron member 17. Desirably, the member 17 has downwardly turned edges 27 which serve to reinforce and stiffen the member as well as provide an easy mounting means. However, other treatments can be employed for these purposes.

It is apparent from the above that the device of the present invention is of very simple construction, consisting essentially of only two flat members bolted or otherwise secured together. Thus, complex bending operations are avoided. Further, since the center member 19 is gently divergent, the cans which are discharged onto the center member are supported throughout their length of travel so even if they are slightly off to one side, they nevertheless will stay in the center lane. An additional advantage of the present invention is that there is a sharp ledge 25 formed between the center member and the side member so that once a can has been slightly diverted it will be engaged by the ledge and gently urged to one side or the other. It will be understood that containers are frequently segregated after they have been filled but before they have been provided with a cover so that it is necessary to handle the containers very gently to avoid spilling the contents. The present invention provides easy means for doing this since the containers are only slightly diverted by the initial deflection members 9 or 11.

Although the device of the present invention has been shown as a symmetrical arrangement having two side sections and a center section, in some operations it is necessary to provide only two exit paths. For instance, it may be desired to only reject under-weight articles allowing those that are on-weight or over-weight to follow the center path. In this event, only a portion of the device need be provided namely what has been described as the center path and one of the side paths.

I claim:
1. In a segregating device:
(a) a continuous, flat surfaced, fixed, gravity chute having a planar apron, said apron extending downwardly in the path of travel of articles to be segregated;
(b) a raised portion fixed to said apron having a relatively small entrance cross section and diverting to a relatively large exit section;
(c) said raised portion being a planar surface parallel with said apron, both said apron and said raised portion constituting conveying surfaces;
(d) said device having an abrupt ledge between said apron and said raised portion;
(e) whereby articles placed on said raised portion can slide forward in a generally straight line on said raised portion and whereby articles placed on said apron will be diverted by said ledge and will slide on said apron forward and to one side by engagement with said ledge.

2. The structure of claim 1 wherein said apron extends on both sides of said raised portion and said raised portion has two divergent sides.

References Cited

UNITED STATES PATENTS

| | | | |
|---|---|---|---|
| 586,265 | 7/1897 | Beebe et al. | 193—31 |
| 990,058 | 4/1911 | Martell | 193—39 |
| 3,139,965 | 7/1964 | Eggert | 198—31 |
| 3,237,743 | 3/1966 | Seaborn | 193—31 |

ANDRES H. NIELSEN, *Primary Examiner.*

U.S. Cl. X.R.

198—31